United States Patent
Turina et al.

(10) Patent No.: US 6,826,198 B2
(45) Date of Patent: Nov. 30, 2004

(54) SIGNALING TRANSPORT PROTOCOL EXTENSIONS FOR LOAD BALANCING AND SERVER POOL SUPPORT

(75) Inventors: Klaus Turina, Backnang (DE); Josephus Kuster, Prosper, TX (US); Dimitris Papadimitriou, Dallas, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 770 days.

(21) Appl. No.: 09/740,175

(22) Filed: Dec. 18, 2000

(65) Prior Publication Data

US 2002/0075900 A1 Jun. 20, 2002

(51) Int. Cl.[7] .................................................. H04J 3/22
(52) U.S. Cl. ....................................... 370/467; 370/469
(58) Field of Search ................................ 370/465, 466, 370/467, 469, 401, 496, 522

(56) References Cited

U.S. PATENT DOCUMENTS

| | | | | |
|---|---|---|---|---|
| 5,706,286 A | * | 1/1998 | Reiman et al. ............. | 370/401 |
| 6,011,803 A | * | 1/2000 | Bicknell et al. ............ | 370/467 |
| 6,154,467 A | * | 11/2000 | Hager et al. ................ | 370/467 |
| 6,178,181 B1 | * | 1/2001 | Glitho ........................ | 370/467 |
| 6,282,191 B1 | * | 8/2001 | Cumberton et al. ........ | 370/352 |
| 6,324,183 B1 | * | 11/2001 | Miller et al. ................ | 370/467 |
| 6,411,632 B2 | * | 6/2002 | Lindgren et al. ........... | 370/466 |
| 6,424,638 B1 | * | 7/2002 | Ray et al. .................... | 370/331 |
| 6,504,852 B1 | * | 1/2003 | Couturier et al. .......... | 370/467 |
| 6,507,649 B1 | * | 1/2003 | Tovander .................... | 379/230 |
| 6,529,524 B1 | * | 3/2003 | Liao et al. ................... | 370/467 |
| 6,594,258 B1 | * | 7/2003 | Larson et al. ............... | 370/353 |
| 6,611,533 B1 | * | 8/2003 | Liao et al. ................... | 370/467 |
| 6,631,140 B1 | * | 10/2003 | Sjodin ......................... | 370/469 |
| 6,683,881 B1 | * | 1/2004 | Mijares et al. .............. | 370/401 |
| 6,687,243 B1 | * | 2/2004 | Sayers et al. ............... | 370/356 |

FOREIGN PATENT DOCUMENTS

| | | |
|---|---|---|
| EP | 1 049 307 A1 | 11/2000 |
| WO | WO 99/29124 | 6/1999 |
| WO | WO 00/19758 | 4/2000 |
| WO | WO 00/51395 | 8/2000 |

OTHER PUBLICATIONS

Stewart, R.R. et al., "Data Distribution Protocol (DDP)", Network Working Group, Internet Draft, <draft–xie–stewart–sigtran–ddp–01.txt> Apr. 12, 2000.

Loughney, J. et al., "SS7 SCCP–User Adaptation Layer (SUA)", Internet Draft, Internet Engineering Task Force, <draft–ietf–sigtran–sua–01. txt>, Jul. 2, 2000.

Stewart, R.R. et al., "Stream Control Transmission Protocol", Network Working Group, Internet–Draft, <draft–ietf–sigtran–sctp–13. txt>, Jul. 11, 2000.

(List continued on next page.)

*Primary Examiner*—Douglas Olms
*Assistant Examiner*—Van Kim T. Nguyen

(57) ABSTRACT

To achieve an improved support for introduction of server pools in packet networks and further to achieve transparency for applications the present invention provides a communication apparatus running a protocol stack implementation for interworking between a signaling source node and a signaling target node. The communication apparatus comprises a first protocol implementation unit (SCTP) adapted to run a signaling control layer on top of a packet transfer network (IP) for exchange of signaling messages via at least one signaling association. Further, the communication apparatus comprises a second protocol implementation unit (SUP, M3UA) adapted to run a user adaptation layer on top of the signaling control layer (SCTP) for support of signaling connection control services (RANAP) used by the signaling source node. A name mapping unit is adapted to receive a signaling target node name from the signaling source node and to map the signaling target node name into a peer signaling association.

20 Claims, 9 Drawing Sheets

OTHER PUBLICATIONS

Ong, L. et al., "Framework Architecture for Signaling Transport", Network Working Group, Request for Comments: 2719, Category: Informational, Oct. 1999.

Coene, L. et al., "Signalling Transport over SCTP applicability statement", Internet Draft, Oct. 30, 2000, XP-002220548, pp. 1–37.

Stewart, R et al., "Stream Control Transmission Protocol", Network Working Group, Oct. 31, 2000, XP-002220549, pp. 1–134.

Form ISA/210 International Search Report for PCT/EP01/14952 (4 pgs.).

* cited by examiner

SIGNALING TRANSPORT PROTOCOL EXTENSIONS FOR LOAD BALANCING AND SERVER POOL SUPPORT

FIELD OF INVENTION

The present invention relates to signaling transport protocol extensions for load balancing and server pool support, and in particular to the provision of a name translation mechanism within such a signaling transport protocol.

BACKGROUND OF INVENTION

FIG. 1 shows a signaling transport protocol stack as defined by the Internet Engineering Task Force IETF for the provision of standard signaling connection control part SCCP services and standard message transfer part layer 3 MTP3 services.

As shown in FIG. 1, on top of the Internet protocol IP there runs a stream control transmission protocol SCTP. The stream control transmission protocol SCTP has been developed to improve the quality of service capabilities which are particularly required for real time communication applications.

As also shown in FIG. 1 on top of the stream control transmission protocol SCTP runs, e.g., the signaling connection control part SCCP user adaptation layer SUA and/or the MTP3 user adaptation layer M3UA according to the SIGTRAN protocol stacks defined by the Internet Engineering Task Force IETF. All these protocols and related implementations are commonly known in the art and therefore will not be explained in detail.

The SIGTRAN protocol stack shown in FIG. 1 is used to transport signaling messages using the common channel signaling system No. 7 also referred to as CCS No. 7 in the following: over the IP network. Typically, mobile cellular communication networks rely to a very large extent on signaling connection control part SCCP services. Specific examples are the radio access network application part RANAP for third generation cellular mobile communication networks and the base station system application part BSSAP for second generation cellular mobile communication networks. Yet another example for an SCCP service is the transaction capability application part TCAP used by the mobile application part MAP, the intelligent network application part INAP, and the customized application mobile for enhanced logic CAMEL.

When migrating the common channel signaling system services to an Internet protocol IF backbone infrastructure, all these protocols must be supported via SUA/SCTP/IP. However, the migration of CCS7 SCCP services to an IP backbone infrastructure leads to problems since these services and their addressing mechanisms originate from a circuit switched environment. I.e., the SCCP services use either a destination point code DPC and subsystem numbers SSN or a global title GT to address specific users. Therefore, both addressing mechanisms point to a single destination in the network which has been the exact requirement for the circuit switched world.

To the contrary, the migration to an Internet protocol IP based backbone network will provide new possibilities to enhance service provisioning. Recently, server pools have been proposed to increase service availability and capacity in future mobile cellular communication networks. Server pools are seen from the outside as a single logical entity. A user requesting a service from such a server pool does not consider which actual physical server is going to handle his request.

However, while from the viewpoint of network, e.g., characteristics it may be desirable to have an equal load balancing over all servers comprised in the server pool, existing addressing mechanisms do not support such a load balancing between different servers in a server pool.

A possible solution using available technologies is to go up to the SCCP protocol level and to carry out the selection on this user layer. Then the request for the handling of a service by a specific server in a server pool must be retransmitted to the selected server. This solution causes an additional data exchange overhead and service provision delay during service execution and consumes additional processing capacity

SUMMARY OF INVENTION

In view of the above, the object of the present invention is to achieve an improved support for the introduction of server pools in packet based networks and to achieve transparency for applications.

According to the present invention this object is achieved by a communication apparatus running a protocol stack implementation for interworking between a signaling source node and a signaling target node, comprising a first protocol implementation unit adapted to run a signaling control layer SCTP of the protocol stack on top of a packet transfer network IP for exchange of signaling data via at least one signaling association, a second protocol implementation unit adapted to run a user adaptation layer SUA of the protocol stack on top of the signalling control layer SCTP for support of signalling connection control services SCCP used by the signaling source node, wherein a name mapping unit is adapted to receive a signaling target node name from the signaling source node and to map the signaling target node name into a peer signaling association.

Therefore, the present invention allows to support server pooling in SUA with increased system fault tolerance due to the provision of server pools. Additional benefits are dynamic system scalability, i.e. the ability for adding and removal of servers without reconfiguration of remaining servers.

Further, the present invention achieves real time name translation, e.g., through provision of local copies of data relating to name mapping in each network node and/or host. In addition, the name translation mechanism according to the present invention supports association handling, i.e. multiple interactions between a client SCCP user and a destination server in a server pool having a destination name. Also, the name translation mechanism according to the present invention allows for the use of name mapping related data and services in a distributed manner across an operational scope of the Internet protocol IP network. The name mapping unit itself may in this case be implemented, e.g., as agent in different network nodes.

As server pools are usually addressed on a name basis and the related addresses are then resolved within the inventive name transition mechanism, new servers may register in server pools in an automatic manner leading to a significant decrease of operation administration and maintenance costs since new server addresses must not be administered manually in every node of the Internet protocol IP network.

Yet another important benefit of the present invention is that upper layer protocols like SCCP and/or MTP3 must not decide on load balancing. This functionality is encapsulated in the name translation mechanism provided for the SUA layer and thus may be changed and renegotiated during operation—e.g., depending on time—without affecting the upper user layer. This leads to a better load balancing within the server pool.

Further, due to the encapsulation of the name translation mechanism in the lower SUA layer of the SIGTRAN stack the inventive solution is applicable to all SUA users.

According to a preferred embodiment of the present invention the name mapping unit of the communication apparatus comprises a mapping data interface unit adapted to distribute and/or receive signaling association attributes via the signaling control layer SCTP.

This preferred embodiment of the invention allows for a name translation interworking between a plurality of communication apparatuses in the network to increase fault tolerance.

According to yet another preferred embodiment of the present invention the name mapping unit also comprises a memory unit adapted to store signaling association attributes—used in the context of addressing of signaling messages—locally in the communication apparatus.

According to this preferred embodiment of the present invention mapping related data is updated only in a single data base and may then be distributed in the Internet protocol IP network via local copies of the mapping related data. A periodic update of name space and/or attribute data in a data base improves data consistency. Further, this feature supports real time name mapping through avoidance of messaging for name space and/or attributed data.

According to yet another preferred embodiment of the present invention the target node name resolution unit is adapted to map a destination name into the peer signaling association according to a specified algorithm. Examples for such algorithms are query response data base mechanism such as ENRP/DDP. Yet another alternative is a table lookup technique.

This preferred embodiment of the present invention increases flexibility through a specification of a name mapping mechanism. In conclusion, the mapping acts as generic interface capable of interworking with different name spaces.

According to yet another preferred embodiment of the present invention the target node name resolution unit is of a client/server type responding to name translation requests from signaling source node clients in a local and/or remote manner.

The client/server architecture increases fault tolerance of the target node name resolution unit. Further, it enables backup server selection or, equivalently, the implementation of a server hunting and takeover procedure. Overall, load balancing for a plurality of name mapping processes in the Internet protocol IP network may be improved.

According to yet another preferred embodiment of the present invention the target node name resolution unit is further adapted to consider at least one criterion selected from a group comprising target node capability, target node load and routing criteria association attributes to map the signaling target node name into the peer signaling association.

This preferred embodiment of the present invention achieves optimal name mapping in view of criteria that may change over time.

According to yet another preferred embodiment of the present invention the name mapping unit further comprises a fault management unit adapted to detect an inoperative peer signaling association and/or an inoperative signaling transport address in a peer signaling association and to select another signaling transport address under the same destination name.

This preferred embodiment of the present invention is of particular advantage during an Internet protocol IP network failure detection and a subsequent automatic recovery. In other words, the name translation service may survive, e.g., in isolated communication islands.

Also, this feature enables improved mapping data consistency and supports failure mechanisms between different instances, e.g., servers comprised in a server pool.

Further, this preferred embodiment of the present invention may be used to support maintenance operations in the network.

Similar advantages as outlined above with respect to the communication apparatus are also achieved with the inventive method of running a protocol stack implementation for interworking between a signaling source node and a signaling target node.

Still further, the present invention is also provided to achieve an implementation of the inventive method steps on computer or processor systems. In conclusion, such implementation leads to the provision of computer program products for use within a computer system.

The programs defining the functions of the present invention can be delivered to a computer/processor in many forms, including, but not limited to information permanently stored on a non-writable storage medium e.g., read only memory devices such as ROM or CDROM discs readable by processors or computer I/O attachments; information stored on writable storage media, e.g., floppy discs and harddrives; or information conveyed to a computer/processor through communication media such as a network and/or telephone network and/or Internet or any other suitable interface devices. It should be understood that media when carrying processor readable instructions implement the inventive concept to represent alternate embodiments of the present invention.

BRIEF DESCRIPTION OF DRAWING

In the following, the best mode of carrying out the invention as well as further advantages, objects and preferred embodiments thereof will be described with reference to the drawing in which.

BEST MODE OF CARRYING OUT THE INVENTION

Figure 1:
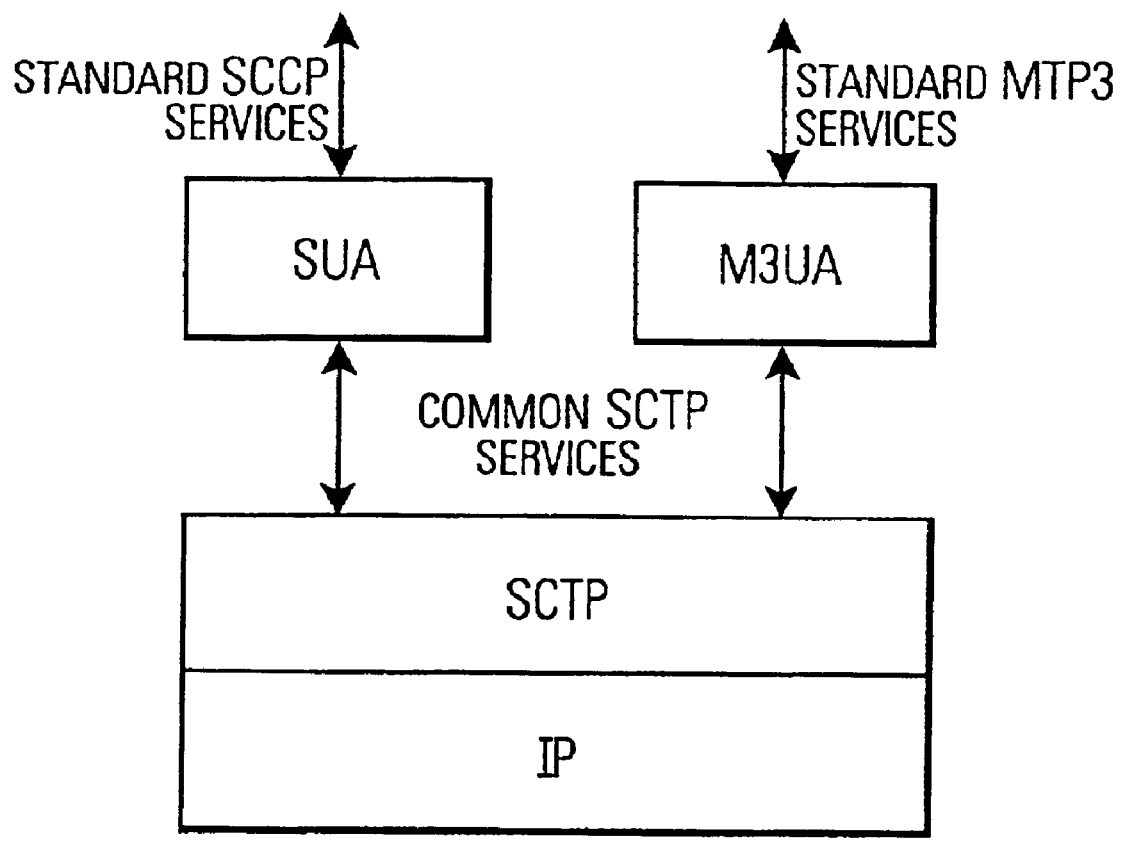
FIG. 1 shows a signaling transport SIGTRAN protocol stack.

In the following, the best mode of carrying out the present invention as well as preferred embodiments thereof, further objects and further advantages will be explained with respect to the drawing. Insofar as different features of the present invention are explained with respect to certain aspects thereof, it is to be understood that these features are combinable with each other to achieve various other modifications and variations of the present invention.

Figure 2:
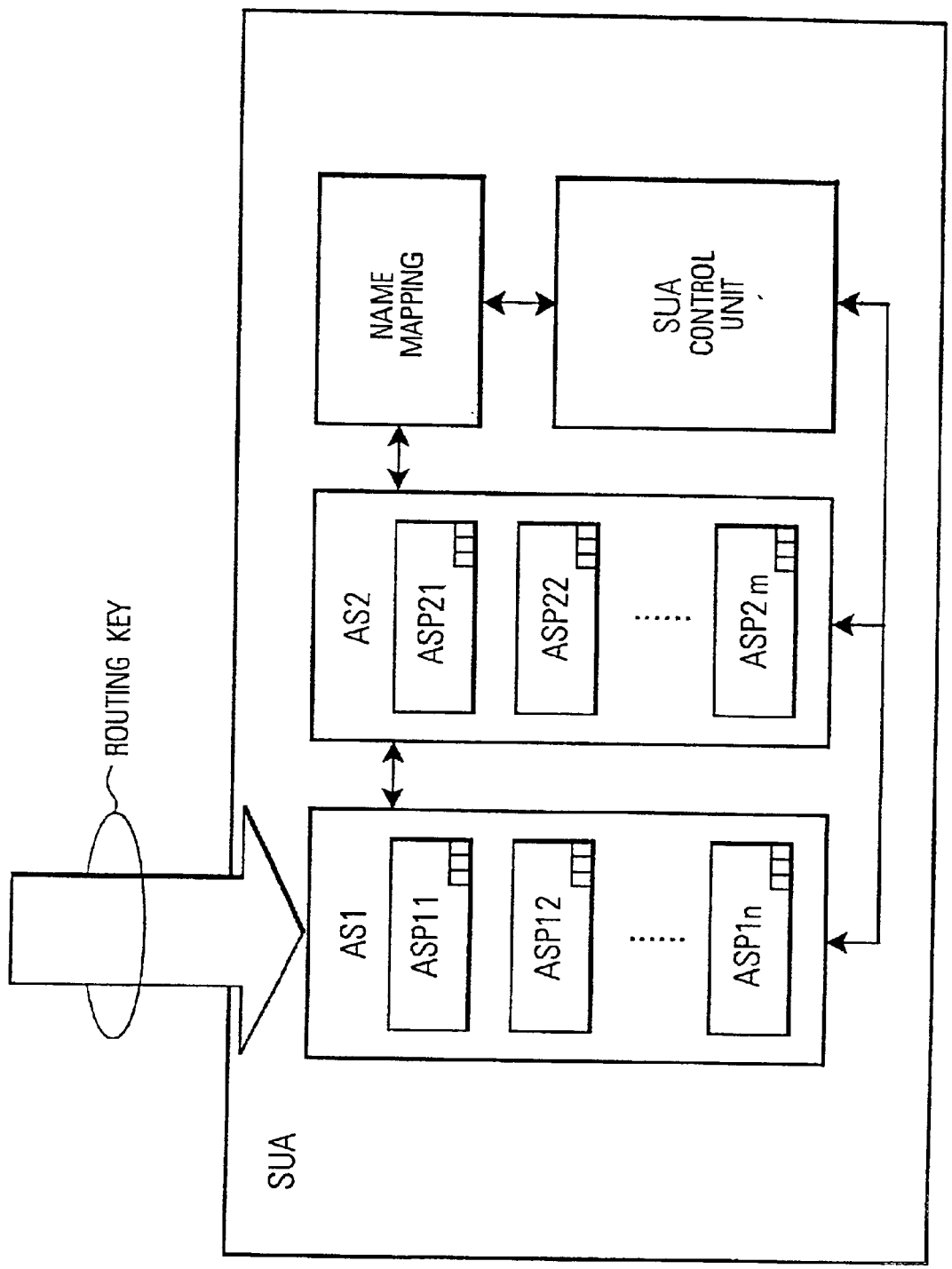
FIG. 2 shows a schematic diagram of the signaling connection control part SCCP user adaptation layer SUA comprising a name mapping according to the present invention.

FIG. 2 shows a schematic diagram of the signaling connection control part SCCP user adaptation layer SUA according to the present invention.

As shown in FIG. 2, the signaling connection control part SCCP user adaptation layer SUA divides in a plurality of application servers AS1, AS2. Each application server is a logical entity serving a range of signaling traffic configured therefor, An example of an application server is a virtual switch element handling all call processing for a unique set of SCCP users. As shown in FIG. 2, the application server contains a set of one or more application server processes of which one or more application server process is actively processing traffic. The application server processes use a so-called SCTP association shown in the form of multiple small rectangles and explained in more detail with respect to FIGS. 3 and 4 in the following.

In more detail, each application process ASP11, ASP12, . . . ASP2m serves as an active or standby process of an application server AS1, AS2, e.g., as part of a distributed signaling node or data base element. An application server process ASPij (i=1, 2, j=1 . . . n or m) uses an SCCP end point and may be configured to process traffic within more than one application server AS1, AS2 (not shown in FIG. 2).

As also shown in FIG. 2, different application servers AS1, AS2 and application server processes ASP11, ASP12, . . . ASP2m are coordinated by a SUA control unit. Further, the SCCP user adaptation layer SUA according to the present invention comprises a name mapping unit receiving a host name from either application server AS1, AS2 in the user adaptation layer SUA for submission to a name translation service implemented in the name mapping unit. The name mapping unit returns information that is required by the user adaptation layer SUA to select one dedicated SCTP association (explained in more detail in the following) towards the requested destination. The return information contains a list of nodes that are related to the host name received by the name mapping unit.

According to the present invention, it is also proposed to achieve name translation in view of, e.g., the load status of the nodes belonging to the submitted host name and a preferred load sharing algorithm. Based on the information generated by the name mapping unit the user adaptation layer SUA can then decide to which application server process the requested service adaptation layer SUA service should be sent and which SCTP association should be used.

Therefore, according to the present invention it is proposed to modify the service adaptation layer SUA user— e.g., BSSAP or RANAP—in a way to use host name based addressing initiating a new signaling transaction. In the user adaptation layer SUA a translation of the host name is implemented in the name mapping unit. However, it is to be noted that this translation may also be implemented externally from the user adaptation layer SUA as long as a mechanism for exchange of host name and related generated addressing information is provided.

The final result of the name translation is a so-called stream control transmission protocol SCTP association identifier that will be used by the user adaptation layer SUA towards the stream control transmission protocol SCTP. Further, the user adaptation layer SUA implementation stores this SCTP association identifier as belonging to a specific dialogue identified by routing keys uniquely defining a range of signaling traffic to be handled by a particular application server for follow-on messages that belong to this dialogue.

Figure 3:
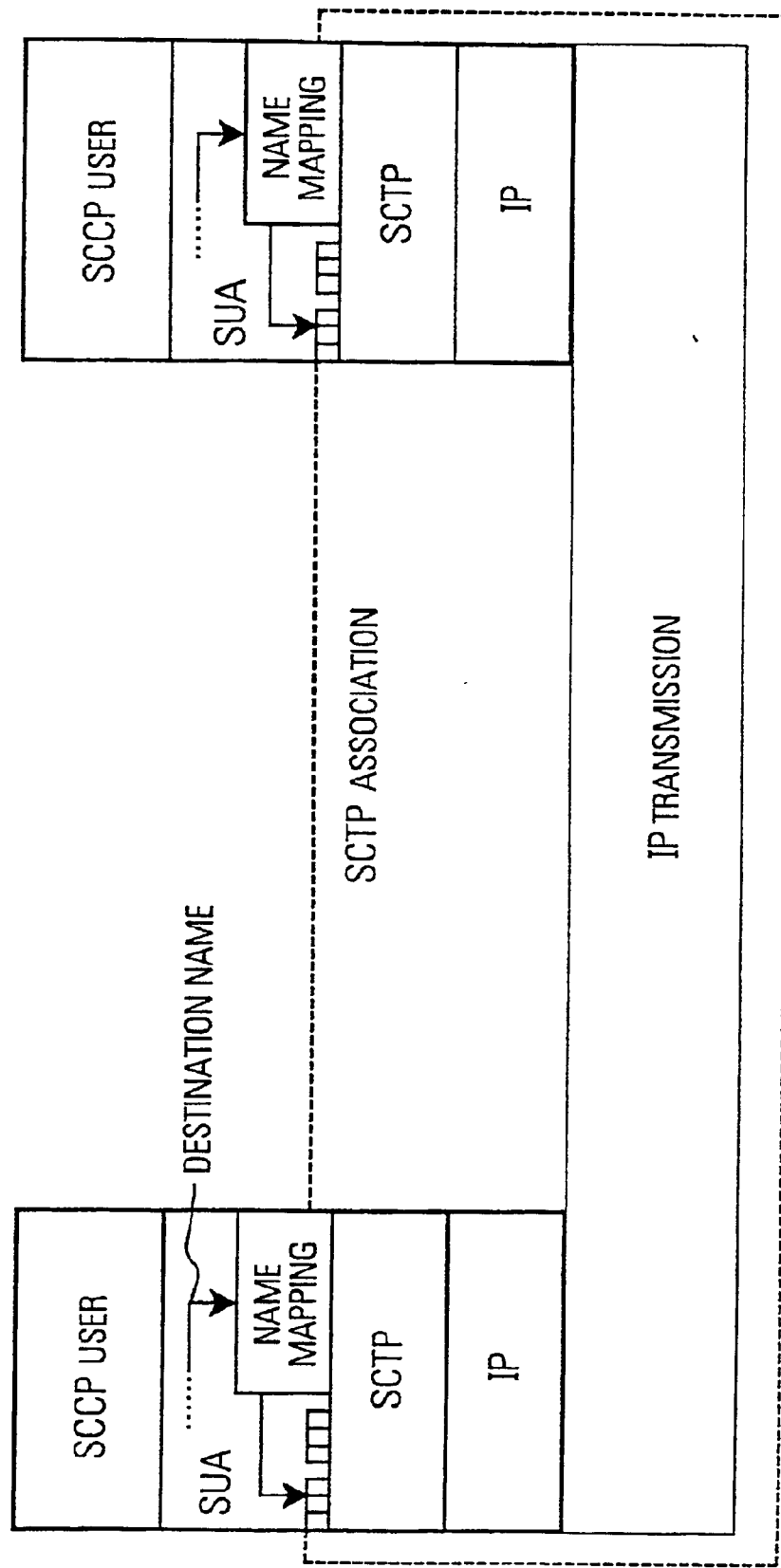
FIG. 3 shows the use of stream control transmission protocol SCTP associations for the exchange of signaling connection, control part SCCP messages and a related name mapping mechanism according to the present invention.

FIG. 3 shows further details of a stream control transmission protocol SCTP association for the exchange of signaling connection control part SCCP messages and the relation thereof to the name making mechanism according to the present invention.

As shown in FIG. 3, the user adaptation layer SUA protocol is used for the transport of any SS7 SCCP user signaling (TCAP, RANAP, BSSAP, . . . ) over IP using the SCTP protocol. It terminates signaling control network SCN signaling and transports SCTP user signaling over TP to an IP signaling end point. Heretofore, a signaling gateway is modelled with at least one application server, which is located, e.g., at the border of SS7 and IP networks. The stream control transmission protocol SCTP protocol layer provides a number of functions such as SCTP association set-up and shut-down, sequence delivery of data streams, data fragmentation, data acknowledgement, congestion avoidance, packet validation and path management.

As also shown in FIG. 3, the stream control transmission protocol SCTP layer supports a SCTP association between SCTP endpoints. Each SCTP endpoint has a list of transport addresses assigned thereto—e.g., multiple IP addresses—to receive or originate SCTP user protocol data packets. An SCTP association spans transfers over all the possible source address/destination address combinations that may be generated between two SCTP endpoints in view of the related list of transport addresses illustrated as subdivided rectangles in FIG. 3. An SCTP association is initiated on request of the signaling endpoint and maintained permanently and allows to link two SCTP endpoints via multiple routes. Such a link of two SCTP endpoints supports an SCTP signaling stream as ion-permanent signaling data exchange via an SCTP association for control processes.

In the following, a peer signaling association is referred to as a set of transport addresses pointing to a group of network destination communication/signaling endpoints registered under the same destination name used by SCTP users.

Figure 4:
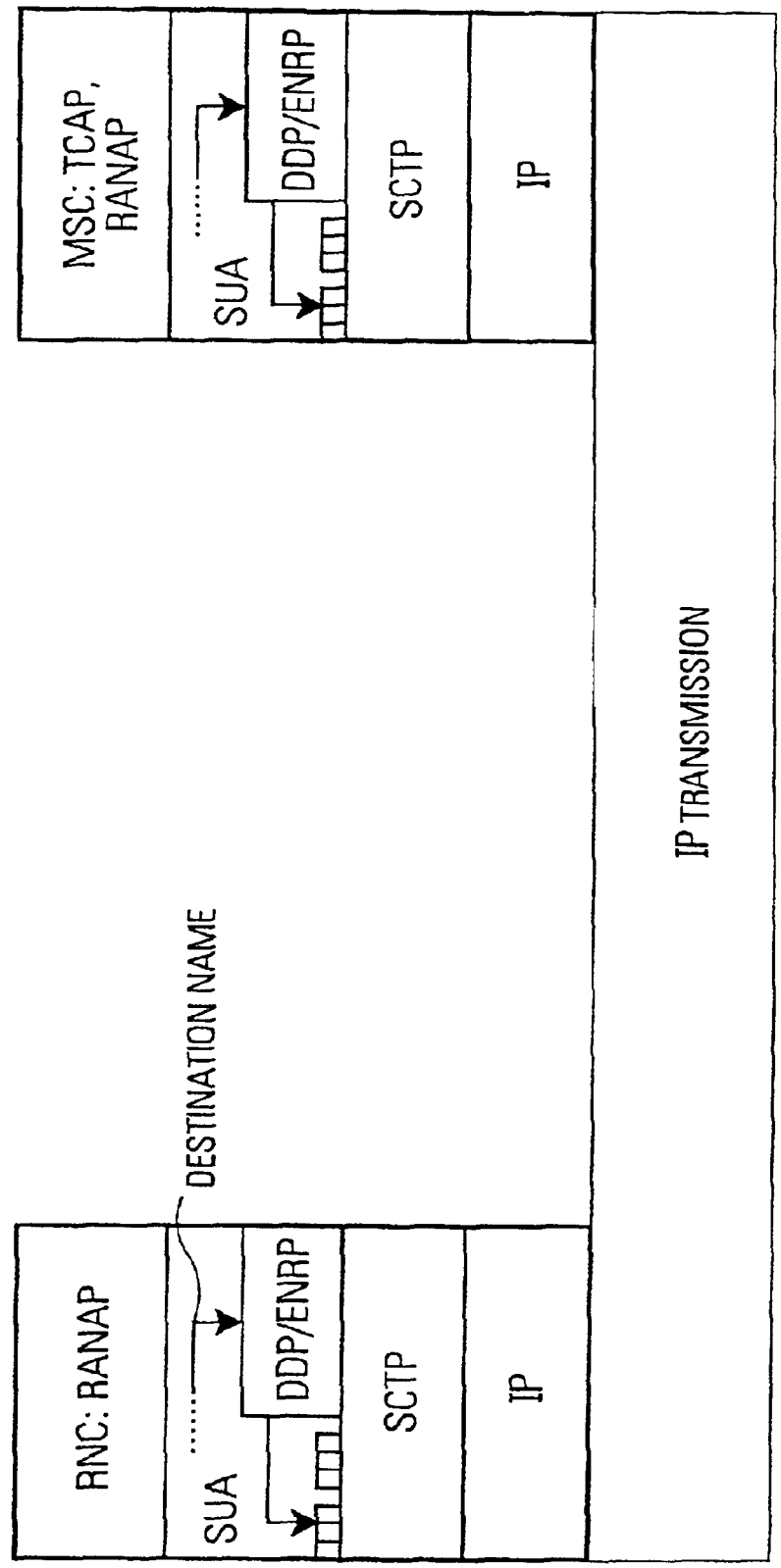
FIG. 4 shows the use of a data distribution protocol DDP and the end point name resolution part ENRP for name translation within the SCCP user adaptation layer SUA according to the present invention.

FIG. 4 shows the use of the data distribution protocol DDP arm the endpoint name resolution part ENRP for name translation within, the SCCP user adaptation layer SUA according to the present invention.

The data distribution protocol DDP shown in FIG. 4 achieves operatively a name based addressing mechanism which isolates a logical communication endpoint from its IP addresses. This effectively eliminates the binding between the communication endpoint and its physical IP addresses.

Further, DDP defines each logical communication destination as a named group thus achieving full transparence support for server pooling and load sharing. It allows dynamic scalability in that members of a server pool may be added or removed at any time without server interrupt.

Each DDP endpoint uses an ENRP unit to obtain name translation and other related services. Here, the ENRP unit may be implemented as a server program running on a node that manages the name space collectively and replies to service requests from any ENRP client, e.g., the DDP unit. It should be noted that the DDP/ENRP mechanism receiving a destination name from a SUA user—e.g., RNC:RANAP for third generation cellular mobile communication networks—is to be considered as only one example for implementing the general inventive concepts outlined and explained in more detail in one following.

Figure 5:
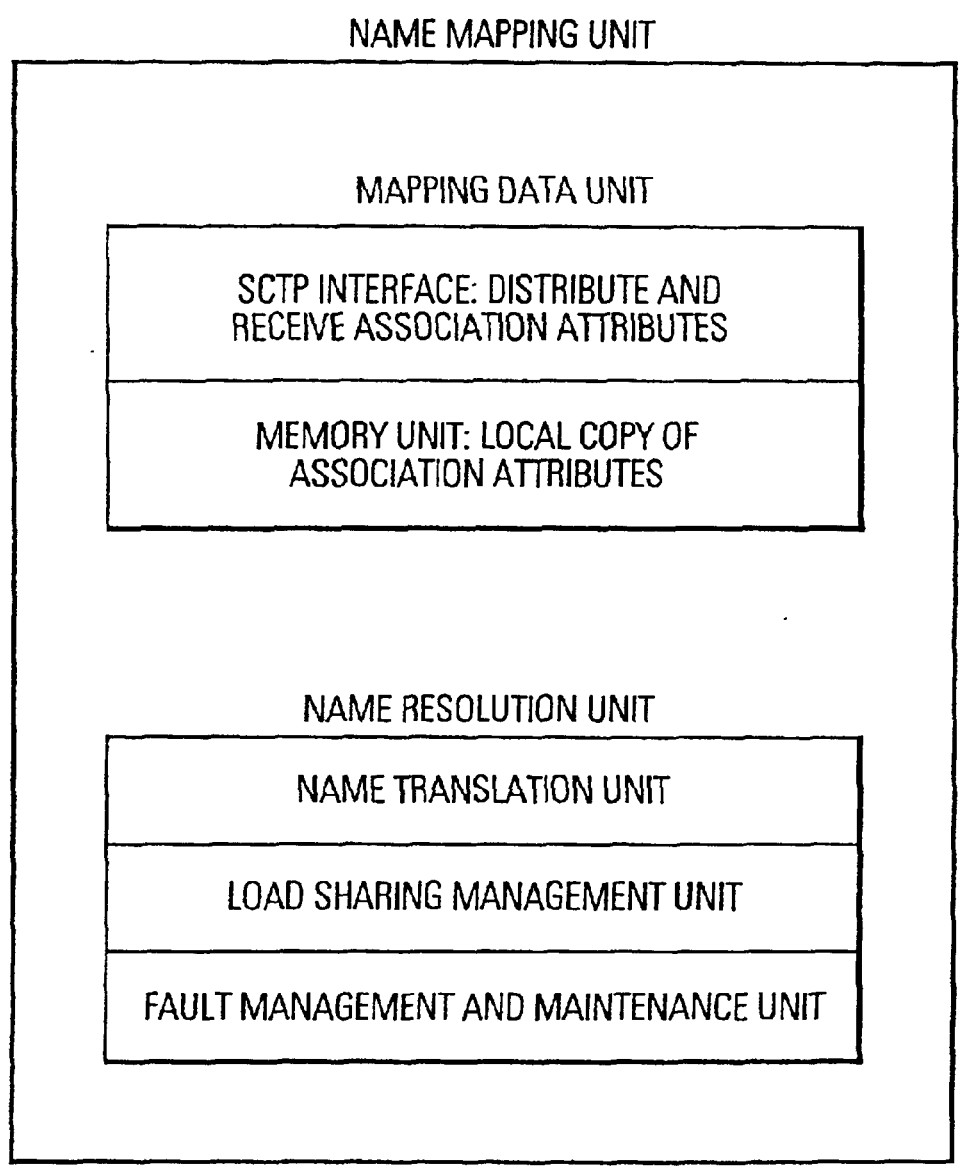
FIG. 5 shows a schematic diagram of the name mapping unit according to the present invention.

Heretofore, FIG. 5 shows a schematic diagram of the name mapping unit interworking with the user adaptation layer SUA.

As shown in FIG. 5, the name mapping unit divides into a mapping data unit and a name resolution unit. Operatively, the mapping data unit is provided to maintain and support data which is necessary for the name mapping according to the present invention. Heretofore, an SCTP interface distributes and receives association attributes and a memory unit maintains local copies of association attributes. It should be noted that the storage of such association attributes is not restricted to a local copy but may be as well achieved at a remote node in the Internet protocol IP network.

As also shown in FIG. 5, the name mapping unit comprises a name resolution unit with a name translation unit adapted to map a destination name into a peer signaling association according to a specified algorithm. According to the present invention, a target node name may be defined, e.g., through specification of a host name, a process name, and/or an SCTP end point name. Further, the algorithm used for the name translation may be freely specified to increase flexibility. Typical examples for algorithms used for the name translation—which, however, should not restrict the scope of the present invention—are a query response data base algorithm—e.g., according to DDP/ENRP described above—or a table look-up algorithm.

As also shown in FIG. 5, the name resolution unit comprises a load sharing management unit and a fault management and maintenance unit adapted to consider at least one criterion selected from a group comprising target node capability, target node load and routing policy to map the submitted destination name into the peer signaling association.

Further, the fault management and maintenance unit is adapted to detect an inoperative peer signaling association and/or an inoperative signaling transport address in a peer signaling association to select another signaling transport address under the same destination name to avoid any loss of signaling data. In other words, if a peer signaling association is not available the build-up thereof is triggered.

Typical examples for the routing policy supported by the load sharing management unit may be, e.g., round robin, weighted round robin least used, and/or least used with degradation, i.e. increment use value after each use of an IP address. Also a combination of these routing policies lies well within the scope of the present invention.

The name mapping unit shown in FIG. 1 as a single entity may as well be realized using a client/server architecture, where a name resolution server responds to name translation requests submitted from clients to achieve a distributed realization of the inventive concept in an Internet protocol IP network.

Figure 6:
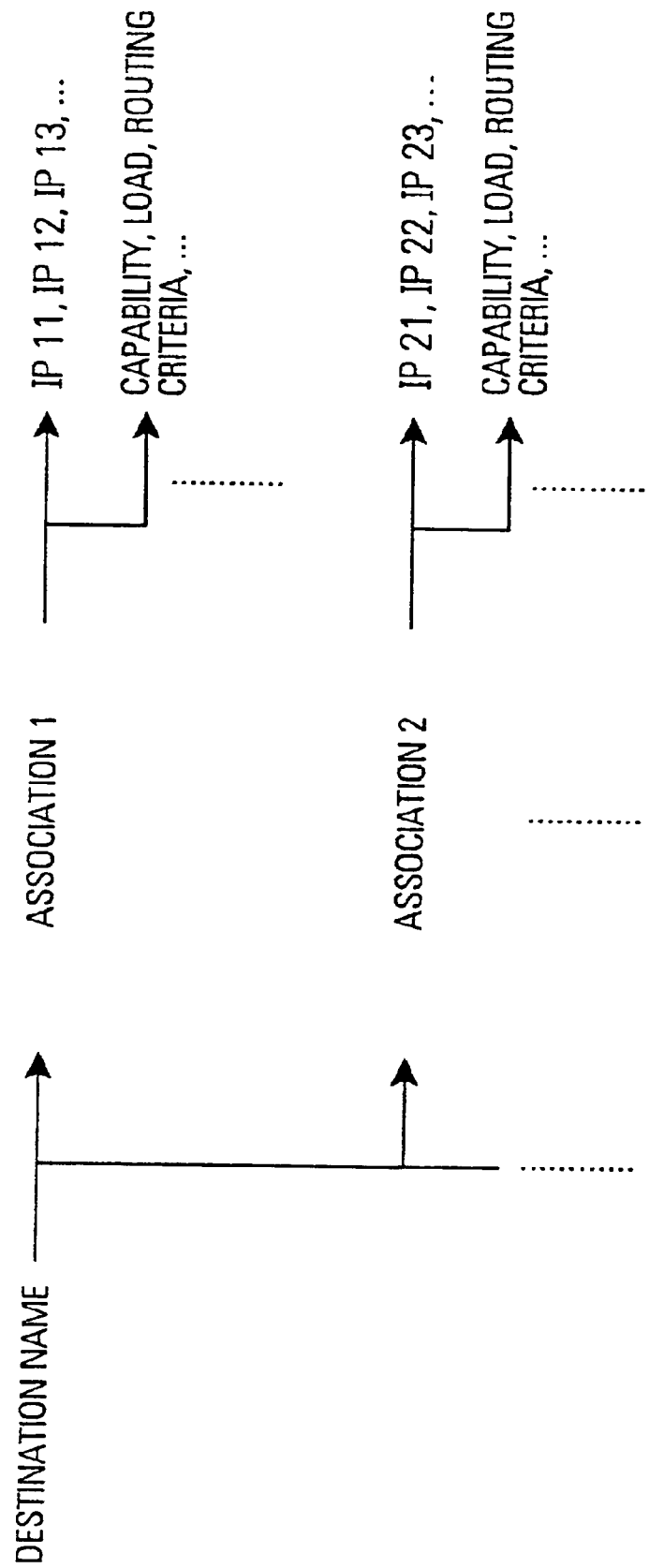
FIG. 6 shows the organization of data necessary for the translation according to the present invention into a suitable data structure, e.g., a tree-structure.

FIG. 6 shows the organization of data—e.g., in the memory unit of the name mapping unit—for an effective implementation of the name translation process.

As shown in FIG. 6, the data for a name translation may be organized into a tree structure where a destination name points to a plurality of SCTP associations. Further, each SCTP association itself points to a plurality of IP addresses that may be used for signaling message exchange between the signaling SCTP source node and a signaling SCTP target node. Further, each SCTP association may also point to a group of criteria for use within the name translation process, e.g., the service capability being related to the SCTP association, the load of each IP endpoint defined for the SCTP association, routing criteria, etc.

It should be noted that the tree structure may be freely extended without any restriction to incorporate further information supporting the name translation process, e.g., the identification of the server implementing the name translation in case the client/server type realization of name translation is used.

Figure 7:
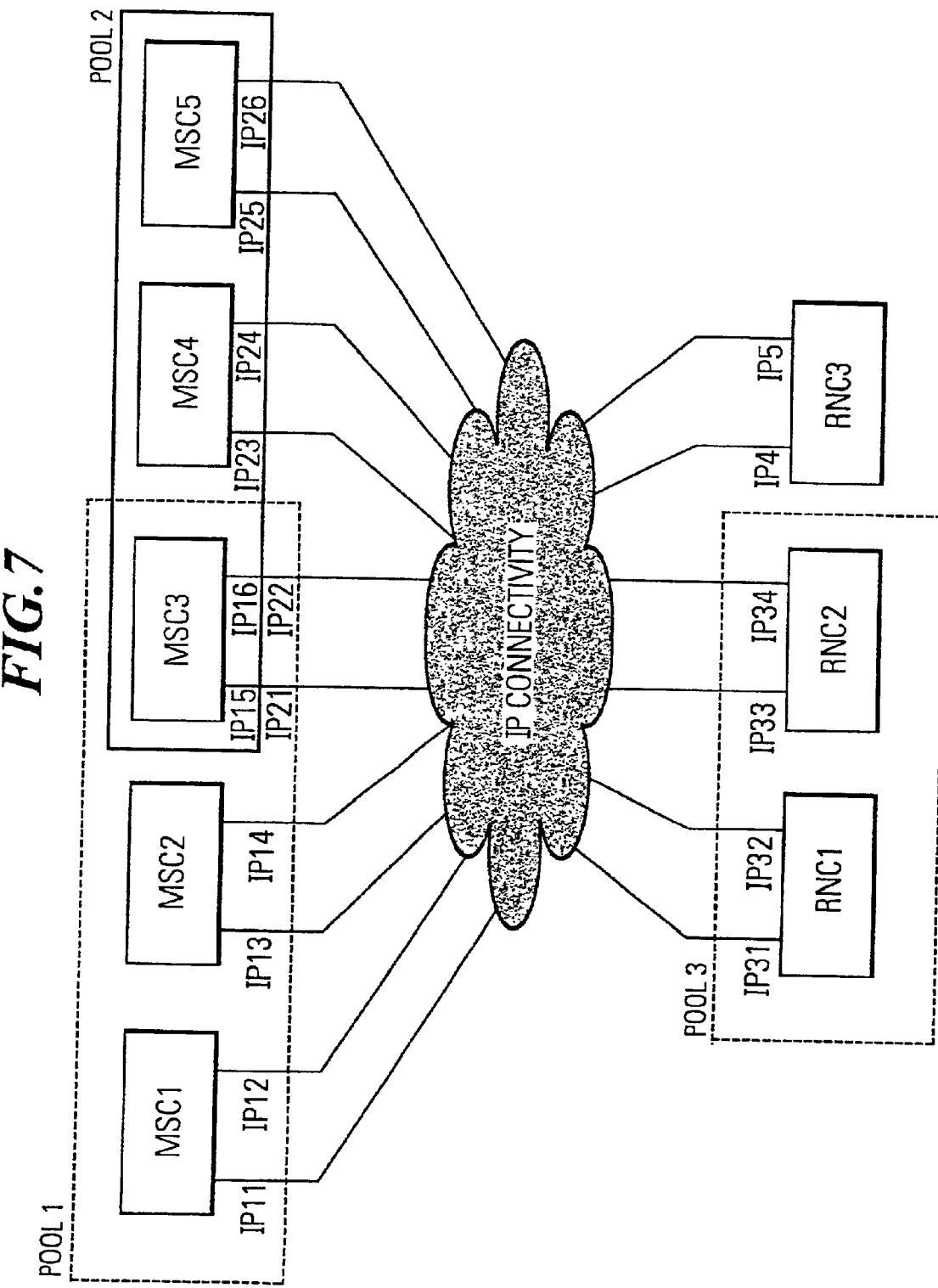
FIG. 7 shows a schematic diagram of a fully Internet protocol IP based load balancing network using the name translation mechanism according to the present invention.

FIG. 7 shows a schematic diagram of a fully Internet protocol IP based load balancing network using the name translation mechanism according to the present invention.

As shown in FIG. 7, the server pool concept being supported by the present invention is applicable, e.g., in a cellular mobile communication network of the third generation. Further, the pooling of servers supports both mobile terminal originating and mobile terminal terminating signaling traffic. Mobile terminal terminating signaling traffic is generated in the pools 1 and 2, while mobile originating signaling traffic is generated via the pool 3. In both cases either network element MSC1, . . . , MSCS or RNC1, RNC2 may use a destination name for the exchange of signaling traffic, e.g., pool 1, pool 2, and/or pool 3. If the IP address independent addressing mechanism is used, the name translation mechanism according to the present invention is supported in the area of the Internet protocol IP network as outlined above.

Therefore, the usual protocol stack needs only one modification, i.e. an interface from the user adaptation layer SUA to a name translation service. As outlined above, name translation in the sense of the present invention requires the reception of a host name and the returning of the name and related server addresses and optionally related supplementary information.

Figure 8:
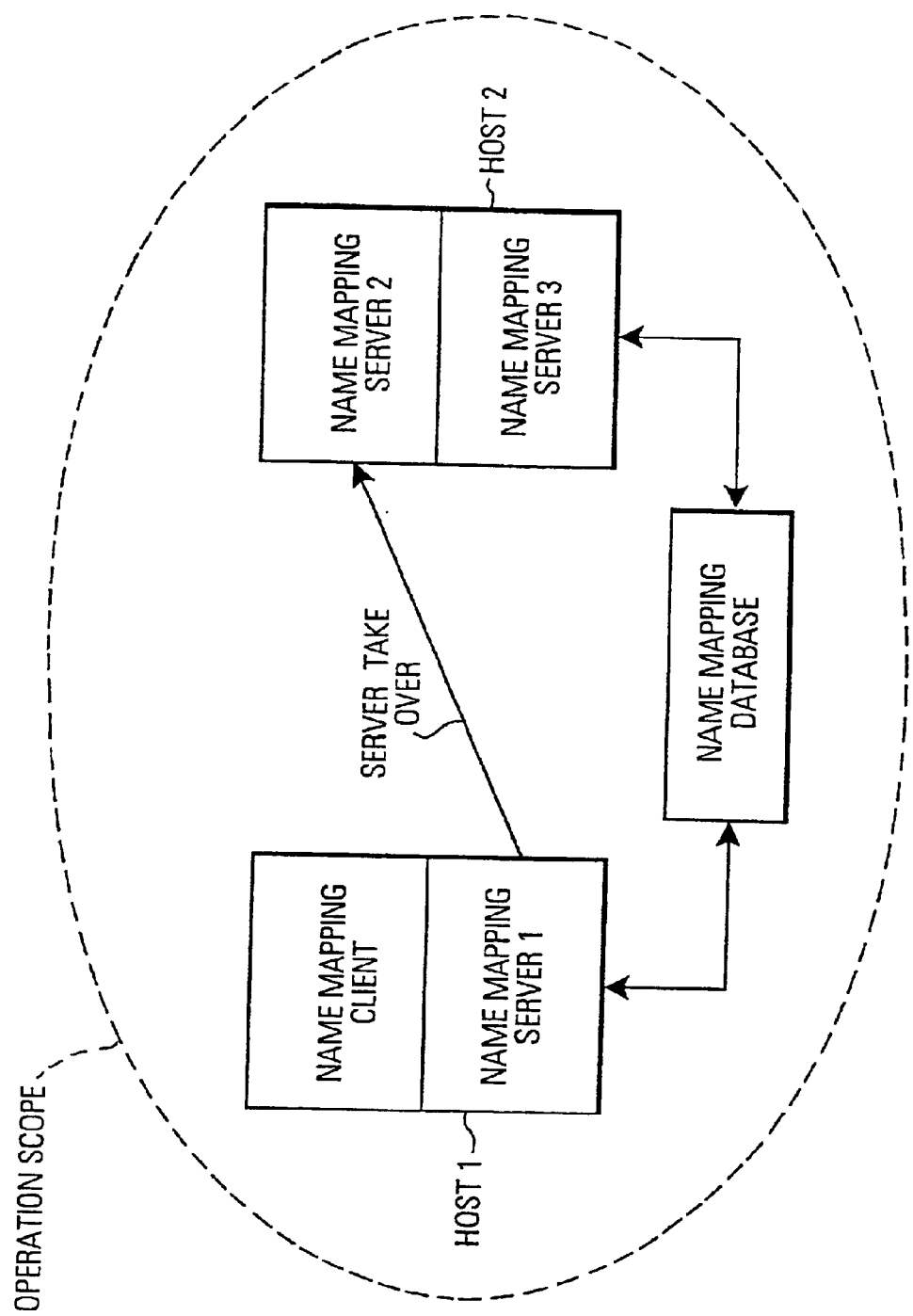
FIG. 8 shows a failure mechanism between different instances supporting name translation according to the present invention.

FIG. 8 shows a failure resolving mechanism between different instances supporting name translation according to the present invention.

As shown in FIG. 8, within an Internet protocol IP network a plurality of name mapping units may be operated as logical entities implementing the name mapping functionality and having the capability to send and receive name translation requests and related translation results.

As also shown in FIG. 8, each such name mapping unit has a certain operation scope being considered as part of the Internet protocol IP network visible by the name mapping unit.

According to the present invention the name translation mechanism is achieved in redundant way. Assuming that a plurality of hosts for the name mapping are provided in the Internet protocol IP network, as soon as one host is inoperative—e.g., due to maintenance operation or failure—the takeover mechanisms are initiated to further prosecute name translation requests at a further host.

While FIG. 8 shows the connection of different hosts to a single name mapping data base, the present invention also covers an embodiment, wherein each host has access to its own dedicated name mapping data base, which is of particular use in case name translation has to be achieved in real time.

Another option for the server takeover could be that specific name translation requests are handled by dedicated hosts in the Internet protocol IP network. In such a case, server hunting for the most suitable host in the Internet protocol IP network would take place for the processing of a submitted request for name translation.

Figure 9:
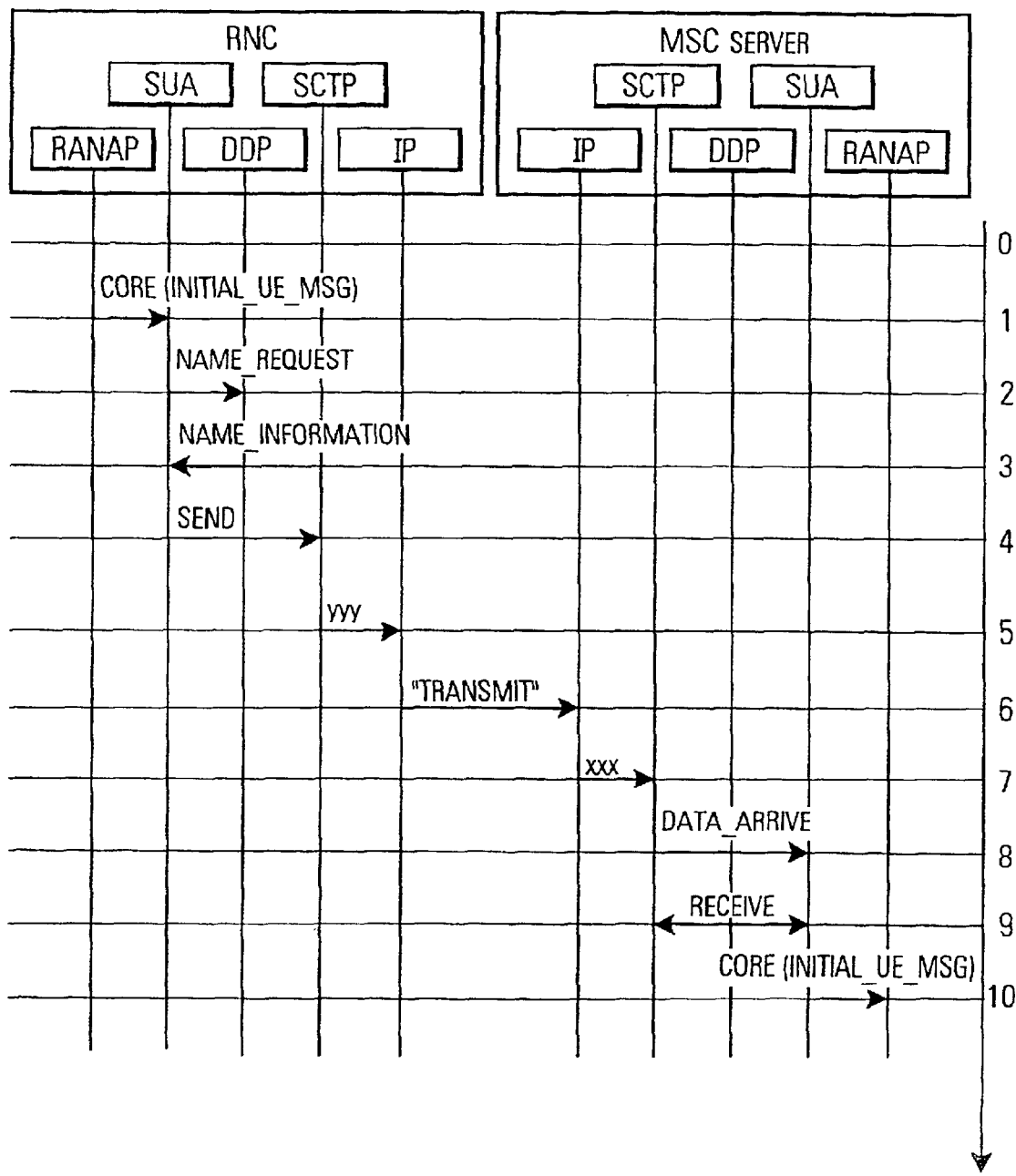
FIG. 9 shows an example for load balancing using the name based addressing mechanism according to the present invention within an extended SIGTRAN protocol stack.

FIG. 9 shows an example for the load balancing using the name based addressing scheme in an extended SIGTRAN protocol stack according to the present invention. Here, it should be noted that this example clearly is not to be construed as limiting the scope of the present invention but is only described as an illustration thereof.

As shown in FIG. 9, signaling occurs between a radio network controller RNC—i.e., a base station for a third generation cellular mobile communication network—and the mobile switching center MSC server. The signaling source node is the radio access network application part RANAP of the radio network controller and the signaling target node is the radio access network application part in the MSC server. As also shown, signaling is supported both in the radio network controller RNC and the mobile switching center MSC server using the SUA/SCTP/IP protocol stack and the data distribution protocol/ENRP service described above.

In the following, the signaling message flow between the signaling source node and the signaling target node will be described as follows:

0. As a prerequisite of the SCTP, associations have to be set up and the DDP/ENRP name translation service has to be initialized. Here, the servers in the different server pools must register with their host name in the name translation service DDP/ENRP.
1. The radio access network application part RANAP will then, issue an initial message INITIAL_UE_MESSAGE to start up a new RANAP connection. For this new RANAP connection an SCCP connection oriented service is necessary so that the SCCP primitive CONNECT_REQUEST (abbreviated as CORE in FIG. 9) is used by the radio access application part RANAP to send the INITIAL_UE_MESSAGE to the core network. Here, the destination is specified, e.g., by the hostname pool 1 shown in FIG. 8. It should be noted that while the introduction of a name based addressing scheme for the user adaptation layer SUA construes an extension to existing standards this extension has not effect on known addressing schemes—e.g., (DPC & SSN, GT)—so that backward compatibility is guaranteed.
2. The user adaptation layer SUA interrogates the name translation service to translate the hostname to an SCTP association, i.e. to real IP addresses. For the example shown in FIG. 9 this is achieved by sending a name request message to the—e.g., local—DDP/ENRP server. The request comprises the hostname parameter received from the radio access network application part RANAP while the DDP/ENRP server uses a set of parameters with respect to this hostname including current load sharing policy, load level, routing values and IP addresses, as outlined above.
3. If the submitted hostname is known in the DDP/ENRP server, it replies with a name information messages containing all SCTP endpoints that are registered under that hostname. In the name information message each SCTP endpoint is identified by IP addresses for the SCTP association and a related routing policy,
4. The user adaptation layer SUA now has all information how to reach the peer signaling association. Therefore, user data is forwarded to the SCTP association using an SCTP sent primitive.
5. The stream control transmission protocol SCTP unit hands the data over to the Internet protocol IP layer.
6. The Internet protocol IP layer forwards the submitted data to the signaling target node.
7. At the signaling target node the received data is handed over to the related stream control transmission protocol SCTP unit.
8. The data arrive primitive informs the MSC SCTP user SUA about the arrival of the new data. It contains the related SCTP association identification together with the message stream identifier.
9. After notification by the stream control transmission part SCTP the user adaptation part SUA uses the received primitive to fetch the new data. It should be noted that no name translation must be performed at the receiving side.
10. The payload INITIAL_UE_MESSAGE is finally forwarded to the application server process, i.e. the radio access network application part RANAP at the signaling target node in the CONNECTION_REQUEST (CORE) message. A CONNECTION_ACKNOWLEDGE message then follows the same SCTP association which is now linked on both the signaling source node side and the signaling target node side.

While in the above, the present invention has been described with reference to the drawing and figures of preferred embodiments of the invention, it should be noted that clearly the present invention may also be implemented using the methods according to the present invention in a digital way using a microprocessor. In this case, the present invention may be embodied as a computer program product directly loadable into the internal memory of the processor comprising software code portions for implementing the inventive concepts outlined above.

Further, it is understood that other modifications will be apparent, too, and can be readily made by those skilled in the art without departing from the scope and spirit of the present invention, e.g., functionalities described above may be realized in software, in hardware, or in combination thereof. Accordingly, it is not intended that the scope of the claims appended hereto is limited to the description as set forth herein, but rather that the claims should be construed so as to encompass all features of patentable novelty that preside in the present invention, including all features that would be treated as equivalent thereof by those skilled in the art to which the present invention pertains.

What is claimed is:

1. A communication apparatus running a protocol stack implementation for interworking between a signaling source node and a signaling target node, comprising:

a first protocol implementation unit Adapted to run a signaling control layer of the protocol stack on top of a packet transfer network for exchange of signaling data via at least one signaling association;

a second protocol implementation unit adapted to run a user adaptation layer of the protocol stack on top of said signaling control layer for support of signaling connection control services used by the signaling source node; wherein a name mapping unit is adapted to receive a signaling target node name from said signaling source node and to map the signaling target node name into a peer signaling association.

2. The communication apparatus of claim 1, wherein said name mapping unit is comprised in said second protocol implementation unit.

3. The communication apparatus of claim 1, wherein said name mapping unit comprises a mapping data interface unit adapted to distribute and/or receive signaling association attributes via said signaling control layer.

4. The communication apparatus of claim 1, wherein said name mapping unit comprises a memory unit adapted to store signaling association attributes locally in the communication apparatus.

5. A communication apparatus running a protocol stack implementation for interworking between a signaling source node and a signaling target node, comprising:
   a first protocol implementation unit adapted to run a signaling control layer of the protocol stack on top of a packet transfer network for exchange of signaling data via at least one signaling association;
   a second protocol implementation unit adapted to run a user adaptation layer of the protocol stack on top of said signaling control layer for support of signaling connection control services used by the signaling source node; wherein
   a name mapping unit is adapted to receive a Signaling target node name from the signaling source node and to map said signaling target node name into a peer signaling association; and
   said mapping unit further comprises a target node name resolution unit adapted to map a destination name into said peer signaling association according to a specified algorithm.

6. The communication apparatus of claim 5, wherein said target node name resolution unit is of a client/server type responding to name translation requests from signaling source node clients in a local and/or remote manner.

7. The communication apparatus of claim 5, wherein said target node name resolution unit is further adapted to consider at least one criterion selected from a group comprising target node capability, target node load, and routing criteria association attributes to map said signaling target node name into said peer signaling association.

8. A communication apparatus running a protocol stack implementation for interworking between a signaling source node and a signaling target node, comprising:
   a first protocol implementation unit adapted to run a signaling control layer of the protocol stack on top of a packet transfer network for exchange of signaling data via at least one signaling association;
   a second protocol implementation unit adapted to run a user adaptation layer of the protocol stack on top of said signaling control layer for support of signaling connection control services used by the signaling source node; wherein
   a name mapping unit is adapted to receive a signaling target node name from the signaling source node and to map said signaling target node name into a peer signaling association, and
   said name mapping unit further comprises a fault management unit adapted to detect an inoperative peer signaling association and/or an inoperative signaling transport address in a peer signaling association and to select another signaling transport address under said same signaling target node name.

9. A method of running a protocol stack implementation for interworking between a signaling source node and a signaling target node, comprising the steps of:
   running a signaling control layer of the protocol stack on top of a packet transfer network for exchange of signaling data via at least one signaling association;
   running a user adaptation layer of the protocol stack on top of said signaling control layer for support of signaling connection control services used by the signaling source node;
   receiving a signaling target node name from the signaling source node and mapping said signaling target node name into a peer signaling association.

10. The method of claim 9, which comprises a step to check an availability of said peer signaling association and triggering a build-up thereof.

11. The method of claim 9, which further comprises a step distributing and/or receiving signaling association attributes via said signaling control layer.

12. The method of claim 9, which further comprises the step of storing signaling association attributes locally at the signaling source node.

13. A method of running a protocol stack implementation for interworking between a signaling source node and a signaling target node, comprising the steps of:
   running a signaling control layer of the protocol stack on top of a packet transfer network for exchange of signaling data via at least one signaling association;
   running a user adaptation layer of the protocol stack on top of said signaling control layer for support of signaling connection control services used by the signaling source node;
   receiving a signaling target node name from the signaling source node and mapping said signaling target node name into a peer signaling association; wherein
   said mapping of said signaling target node name into said peer signaling association is carried out according to a specified algorithm.

14. The method of claim 13, wherein said specified algorithm is a query responsive database algorithm.

15. The method of claim 13, wherein said specified algorithm is a table lookup algorithm.

16. A method of running a protocol stack implementation for interworking between a signaling source node and a signaling target node, comprising the steps of:
   running a signaling control layer of the protocol stack on top of a packet transfer network for exchange of signaling data via at least one signaling association;
   running a user adaptation layer of the protocol stack on top of said signaling control layer for support of signaling connection control services used by the signaling source node;
   receiving a signaling target node name from the signaling source node and mapping said signaling target node name into a peer signaling association;
   considering at least one criterion selected from a group comprising target node capability, target node load, and routing criteria association attributes when mapping said signaling target node name into said peer signaling association.

17. A method of running a protocol stack implementation for interworking between a signaling source node and a signaling target node, comprising the steps of:
   running a signaling control layer of the protocol stack on top of a packet transfer network for exchange of signaling data via at least one signaling association;
   running a user adaptation layer of the protocol stack on top of said signaling control layer for support of signaling connection control services used by the signaling source node;

receiving a signaling target node name from the signaling source node and mapping said signaling target node name into a peer signaling association;

detecting an unreachable peer signaling association and/or an unreachable signaling transport address in a peer signaling association and selecting another signaling transport address under said same signaling target node name.

18. A method of running a protocol stack implementation for interworking between a signaling source node and a signaling target node, comprising the steps:

running a signaling control layer of the protocol stack on top of a packet transfer network for exchange of signaling data via at least one signaling association;

running a user adaptation layer of the protocol stack on top of said signaling control layer for support of signaling connection control services used by the signaling source node;

receiving a signaling target node name from the signaling source node and mapping said signaling target node name into a peer signaling association;

maintaining a data base storing name spaces and/or association attributes and updating said data base.

19. The method of claim 18, wherein said updating of said data base at least comprises one step selected from a group comprising signaling node registration, mapping node registration, signaling node deregistration, mapping node deregistration, and signaling node routing policy change registration.

20. A computer program product directly loadable into the internal memory of a communication device, comprising software code portions for performing the steps of claim 9 when the product is run on a processor of the communication device.

* * * * *

UNITED STATES PATENT AND TRADEMARK OFFICE
CERTIFICATE OF CORRECTION

PATENT NO.       : 6,826,198 B2                                        Page 1 of 1
APPLICATION NO.  : 09/740175
DATED            : November 30, 2004
INVENTOR(S)      : Turina et al.

It is certified that error appears in the above-identified patent and that said Letters Patent is hereby corrected as shown below:

On the Face Page, in Field (57), under "Abstract", in Column 2, Line 12, delete "SUP" and insert -- SUA --, therefor.

In Column 1, Line 48, delete "IF" and insert -- IP --, therefor.

In Column 6, Line 23, delete "TP" and insert -- IP --, therefor.

In Column 6, Line 46, delete "ion-permanent" and insert -- non-permanent --, therefor.

In Column 6, Line 53, delete "arm" and insert -- and --, therefor.

In Column 7, Line 8, delete "one" and insert -- the --, therefor.

In Column 8, Line 27, delete "MSCS" and insert -- MSC5 --, therefor.

Signed and Sealed this

Third Day of March, 2009

JOHN DOLL
*Acting Director of the United States Patent and Trademark Office*